(12) United States Patent
Backes et al.

(10) Patent No.: US 7,697,587 B2
(45) Date of Patent: Apr. 13, 2010

(54) SYSTEMS AND METHODS FOR UTILIZING PULSED RADIO FREQUENCIES IN A RING LASER GYROSCOPE

(75) Inventors: Glen B. Backes, Maple Grove, MN (US); Rodney H. Thorland, Shoreview, MN (US)

(73) Assignee: Honeywell International Inc., Morristown, NJ (US)

( * ) Notice: Subject to any disclaimer, the term of this patent is extended or adjusted under 35 U.S.C. 154(b) by 43 days.

(21) Appl. No.: 11/923,484

(22) Filed: Oct. 24, 2007

(65) Prior Publication Data

US 2008/0089381 A1 Apr. 17, 2008

Related U.S. Application Data

(63) Continuation-in-part of application No. 11/040,469, filed on Jan. 21, 2005, now abandoned.

(51) Int. Cl.
*H01S 3/083* (2006.01)
*G01C 19/64* (2006.01)
(52) U.S. Cl. .................. 372/94; 356/459
(58) Field of Classification Search .......... 372/94; 356/450, 459
See application file for complete search history.

(56) References Cited

U.S. PATENT DOCUMENTS

| | | | | | |
|---|---|---|---|---|---|
| 3,351,870 | A | * | 11/1967 | Goldsmith et al. | 372/81 |
| 3,982,201 | A | * | 9/1976 | Rosenkrantz et al. | 372/75 |
| 5,196,905 | A | * | 3/1993 | Hahn et al. | 356/467 |
| 5,331,403 | A | * | 7/1994 | Rosker et al. | 356/459 |
| 5,381,436 | A | * | 1/1995 | Nelson et al. | 372/94 |
| 5,442,441 | A | * | 8/1995 | Grover et al. | 356/467 |
| 5,488,331 | A | * | 1/1996 | Keane et al. | 330/296 |
| 2003/0201834 | A1 | * | 10/2003 | Pehlke | 330/296 |

* cited by examiner

*Primary Examiner*—Minsun Harvey
*Assistant Examiner*—Phillip Nguyen
(74) *Attorney, Agent, or Firm*—Fogg & Powers LLC

(57) ABSTRACT

Ring laser gyroscope that includes a gyroscope block, a radio frequency transmitting device, and a radio frequency energy source. The gyroscope block has at least one discharge bore containing a gain medium, and the radio frequency transmitting device is located within the gyroscope block in proximity to at least one discharge bore and located so as to encompass the discharge bore. The radio frequency energy source is configured to apply a pulsed radio frequency signal to the transmitting device.

20 Claims, 5 Drawing Sheets

SYSTEMS AND METHODS FOR UTILIZING PULSED RADIO FREQUENCIES IN A RING LASER GYROSCOPE

PRIORITY CLAIM

This application is a CIP of U.S. patent application Ser. No. 11/040,469 filed Jan. 21, 2005.

BACKGROUND OF THE INVENTION

This invention relates generally to ring laser gyroscopes, and more specifically, to systems and methods for utilizing pulsed radio frequencies within ring laser gyroscopes.

At least some known ring laser gyroscopes (RLGs) utilize a direct current (D.C.) voltage discharge in order to start and maintain laser beams within a discharge cavity located in a block of the RLG. A discharge cavity is also sometimes referred to as a gain bore or discharge bore. In such a utilization, D.C. electrodes must be in direct contact with a gain medium of the laser that is contained within the discharge bore. In order to prevent external materials from leaking around these D.C. electrodes, an interfacial seal is used to bond the electrodes to the laser block. The integrity of such interfacial seals has historically limited the temperature range, reliability, and lifetime of RLGs which employ the interfacial seals.

Often the gain necessary to sustain the laser beams within an RLG require discharge currents which are powerful enough to sputter cathode material from the electrodes into the gain medium. This sputtering contaminates the gain medium which results in shortening the laser lifetime and hence gyro reliability and performance. Additionally, the cathode or cathodes, depending upon the RLG configuration, pump gases from the gain medium producing undesirable gas mix changes.

Other known ring laser gyroscopes employ capacitively coupled radio frequency (RF) energy which maintain the laser beams within the gyroscope through discharge of the RF energy. In such gyroscopes, electrodes transmitting RF energy are deposited onto an outer surface of the laser block. Still another known RLG employs an inductive coil wrapped around one leg of the discharge bore within the laser block. In this gyroscope embodiment, the inductive coil may be embedded within the laser block itself. As still another alternative, a capacitively coupled RF apparatus which includes two plates, is embedded within the laser block. When utilizing such an apparatus, one leg of the discharge bore is juxtaposed between two of the plates.

These RLGs couple continuous wave RF energy into the gain medium of a ring laser gyroscope thereby eliminating the need for electrodes within the discharge bores and the resulting problems associated with the sealing of the laser block. However, dynamic impedance characteristics of the gain medium within the discharge bore can cause problems related to controlling an amount of power delivered to the gain medium when utilizing such continuous wave (CW) RF signals.

SUMMARY OF THE INVENTION

In one aspect, a ring laser gyroscope is provided that comprises a gyroscope block having at least one discharge bore containing a gain medium, a radio frequency (RF) transmitting device, and an RF energy source. The transmitting device is within the gyroscope block in proximity to at least one discharge bore. The RF energy source is configured to apply a pulsed RF signal to the RF transmitting device, the RF transmitting device located such that the pulsed RF signal is applied to the gain medium.

In another aspect, a method for pumping a gain medium within a discharge bore of a ring laser gyroscope is provided. The method comprises locating an RF transmitting device in proximity to the discharge bore and providing a pulsed RF signal to the transmitting device such that the pulsed RF signal is applied to the gain medium.

In still another aspect, a ring laser gyroscope is provided which comprises a gain medium, a radio frequency (RF) transmitting device, and an RF energy source. The RF energy source applies a signal to the RF transmitting device. The signal initiates a discharge from the RF transmitting device within the gain medium. The signal is a pulsed RF signal having a duty cycle between zero and one.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
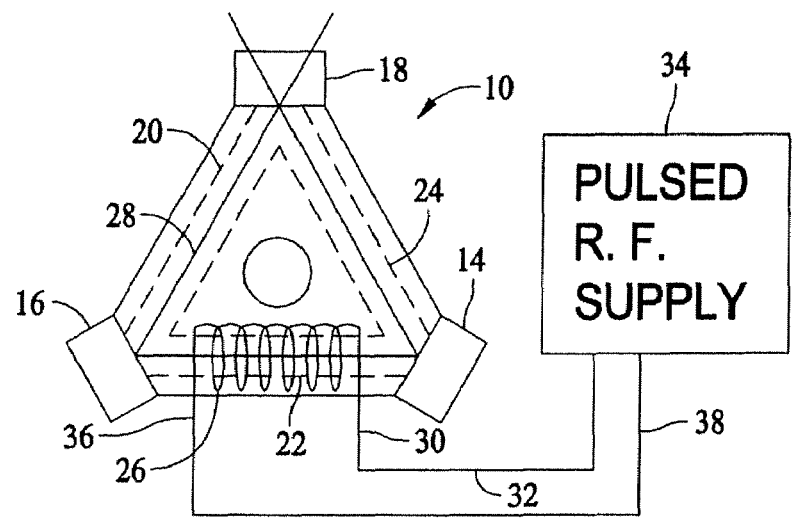
FIG. 1 is a top view of one embodiment of a ring laser gyroscope which includes an inductive coil and a pulsed RF supply.

FIG. 1 is a top view of one embodiment of a ring laser gyroscope (RLG) 10 in which a pulsed radio frequency (RF) is applied to a gain medium. Utilization of pulsed RF reduces average RF power provided to RLG 10 as compared to RLGs which utilize a continuous wave RF signal to initiate and maintain a laser beam within RLG 10. RLG 10 comprises a gyroscope block 12, transducer mirrors 14, 16, a readout mirror 18, discharge bores 20, 22 and 24, and an inductive coil 26. Inductive coil 26 is one embodiment of an RF transmitting device as further described below. Gyroscope block 12, in alternative embodiments, is fabricated from one or more of Zerodur.RTM. (Zerodur is a registered trademark of SCHOTT AG), silica, or another comparable material having stable temperature expansion characteristics. Transducer mirrors 14, 16 and readout mirror 18 are bonded to corners of gyroscope block 12 to form a gas tight seal. A gain medium, for example, helium neon (HeNe) gas may be employed within discharge bores 20, 22, and 24. Upon discharge of the RF signals from inductive coil 26, counter propagating continuous laser beams 28 are induced within RLG 10. Initiation and maintaining a continuous laser beam within RLG 10 utilizing, for example, RF energy, is sometimes referred to as gain pumping of a gain medium.

In the embodiment illustrated, inductive coil 26 is wound around RLG discharge bore 22, for example, and is embedded within gyroscope block 12. Inductive coil 26 is fabricated from any suitable conductive material and may be constructed in accordance with well known coil winding techniques. Inductive coil 26 may be embedded by depositing or printing onto gyroscope block 12, for example, or by drilling holes through gyroscope block 12. A first terminal 30 of inductive coil 26 is connected by a conductor 32 to a pulsed RF supply 34. Pulsed RF supply 34 is sometimes referred to as an RF energy source. A second terminal 36 of inductance coil 26 is connected by conductor 38 to a second terminal of RF supply 34.

A pulsed RF signal (shown in FIG. 2) is transmitted from pulsed RF supply 34 to an RF transmitting device (e.g., inductive coil 26) which substantially encompasses discharge bore 22 which contains the gain medium of RLG 10. This RF signal initiates a discharge which starts and maintains a laser beam within gyroscope block 12. By utilizing a pulsed RF signal, as opposed to a continuous wave RF signal to pump the gain medium within discharge bores 20, 22, and 24 of RLG 10, the average RF power consumed is reduced by, for example, ten times the base-10 log of the duty cycle of the pulsed RF signal. In the described embodiments, the duty cycle is a number between zero and one. In addition, altering the duty cycle and/or power envelope of the pulsed RF also provides an additional mechanism to control the laser discharge and the power of the optical laser output beam.

Figure 2:
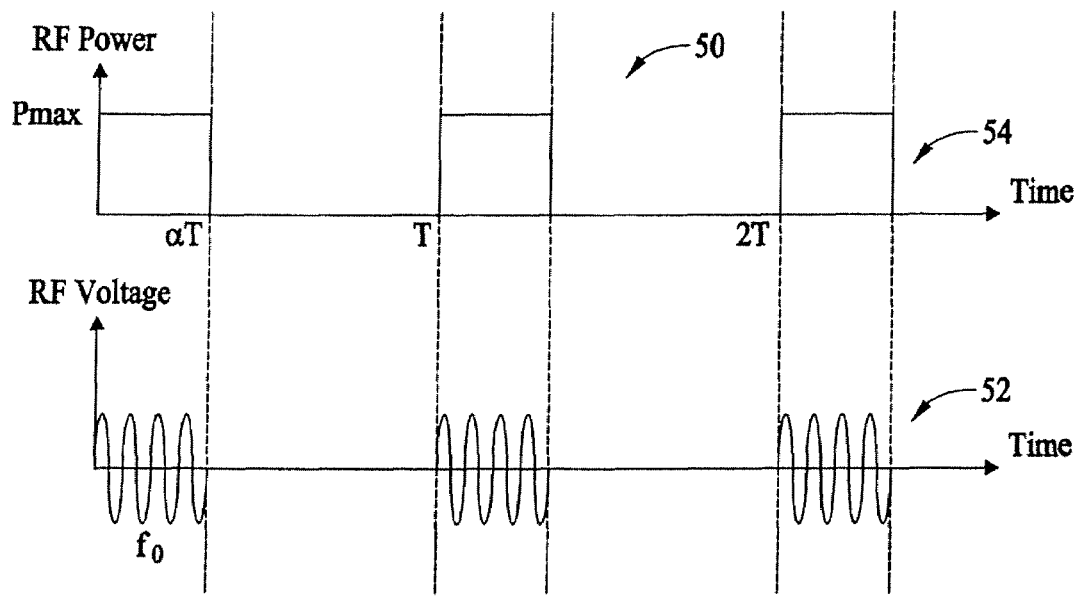
FIG. 2 is a graph illustrating one embodiment of a signal provided by the pulsed RF supply shown in FIG. 1.

The power reduction achieved through utilization of a pulsed RF signal is further illustrated in FIG. 2, which is a graph 50 illustrating a pulsed RF signal 52 and a power envelope 54 generated by pulsed RF signal 52. Graph 50 illustrates an approximate ⅓ duty cycle, which is sometimes referred to as a 33% duty cycle. Pulsed RF signal 52 is composed of a sequential time series of pulses of frequency $f_0$ spaced by a time of T. The pulse width is $\alpha T$ where $\alpha$ is the duty cycle with a unitless range of $0<\alpha<1$. The average power is then the maximum power multiplied by $\alpha$, or Pave=$\alpha$Pmax. The average power delivered by pulsing the RF signal is $10*\log_{10}(\alpha)$ less than the CW case ($\alpha=1$). For example, utilization of pulsed RF supply 34 configured with a duty cycle of 0.1 will result in an average power of 10 dB less than a ring laser gyroscope which utilizes a continuous wave RF supply.

While power envelope 54 is illustrated as being rectangular, the description should not be construed as being limited to a rectangular power envelope. Any arbitrary shaped power envelope may be incorporated. In addition, neither the pulse period T, nor the duty cycle $\alpha$ are limited to a constant value. In other words, a variable pulse period and/or a variable duty cycle may be incorporated into the embodiments described herein.

Figure 3:
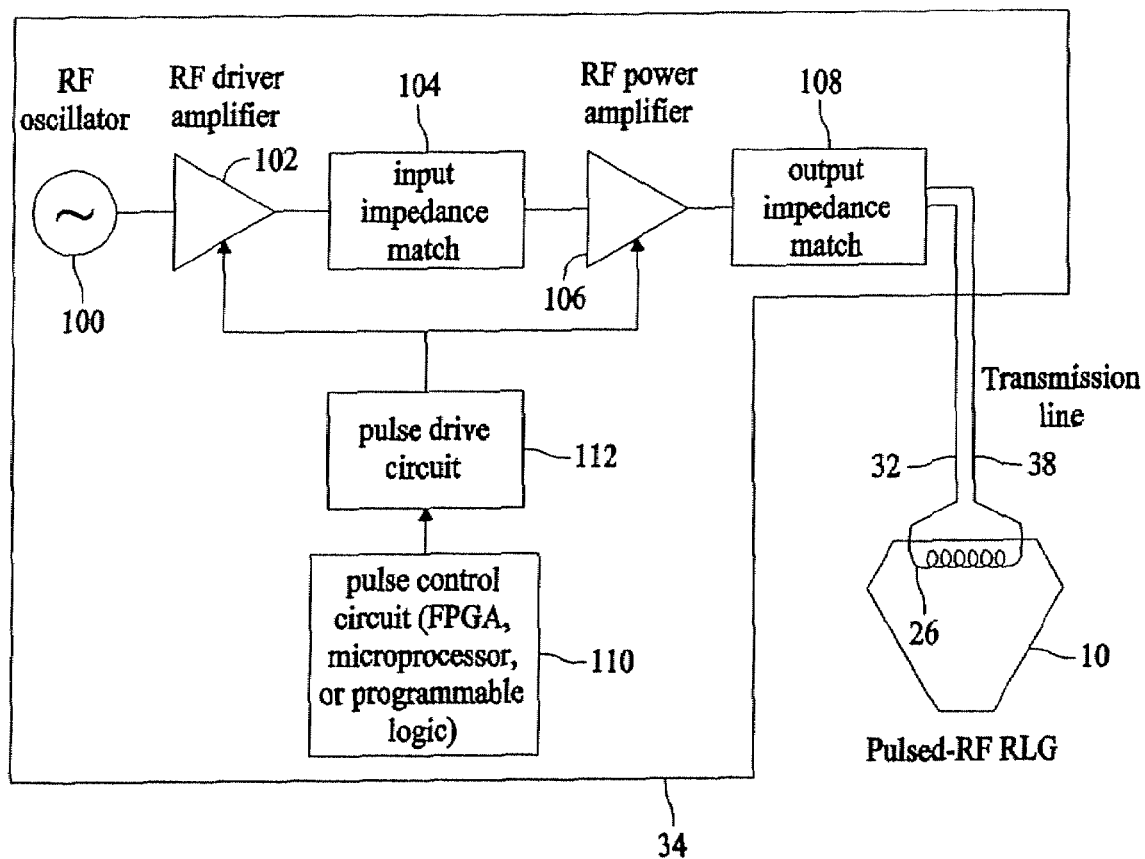
FIG. 3 is a block diagram illustrating one embodiment of a pulsed RF supply for utilization within a ring laser gyroscope.

FIG. 3 is a block diagram of pulsed RF supply 34 which also illustrates a connection to RLG 10. Pulsed RF supply 34 includes an RF oscillator 100, an RF driver amplifier 102 configured to amplify an output of RF oscillator 100, an impedance matching device 104 receiving an output of RF driver amplifier 102, and an RF power amplifier 106 receiving the output of impedance matching device 104. An output of RF power amplifier 106 is received by an output impedance matching unit 108 which is configured to output the pulsed RF signal onto conductors 32 and 38 for transmission to inductive coil 26.

Pulsed RF supply 34 further includes a pulse control circuit 110 and a pulse drive circuit 112, which in combination are configured to control a duty cycle of the RF signal output by pulsed RF supply 34. Pulse drive circuit 112, in one embodiment, is configured to provide signal conditioning, for example, amplification, filtering, and/or impedance matching, to a signal output by pulse drive circuit 110. In alternative embodiments, pulse control circuit 110 is fabricated utilizing a programmable integrated circuit (PIC), a microprocessor, microcontroller or FPGA (field programmable gate array), depending on the level of pulse control desired.

In one embodiment, a method for producing a pulsed RF signal is to modulate the bias current on an active device (i.e., RF driver amplifier 102, RF power amplifier 106) with a high frequency switch. Pulse control circuit 110 provides such a switch. As illustrated, pulse control circuit 110 is configured to control a duty cycle of the RF signal produced by RF oscillator 100 by switching off and on (e.g., modulating the bias current of) RF driver amplifier 102. In such an embodiment, pulse control circuit 110 is configured as a high frequency switch.

In addition, to control an envelope of RF power output by pulsed RF supply 34, pulse control circuit 110 is further configured to provide an enabling signal to RF power amplifier 106. By providing controlling signals to both RF driver amplifier 102 and RF power amplifier 106 utilizing pulse control circuit 110, which is in one embodiment user configurable, a user is able to control the output of pulsed RF supply 34. Specifically, both the duty cycle of the generated RF signal and the shape of a power envelope output by pulsed RF supply 34 are user programmable.

Figure 4:
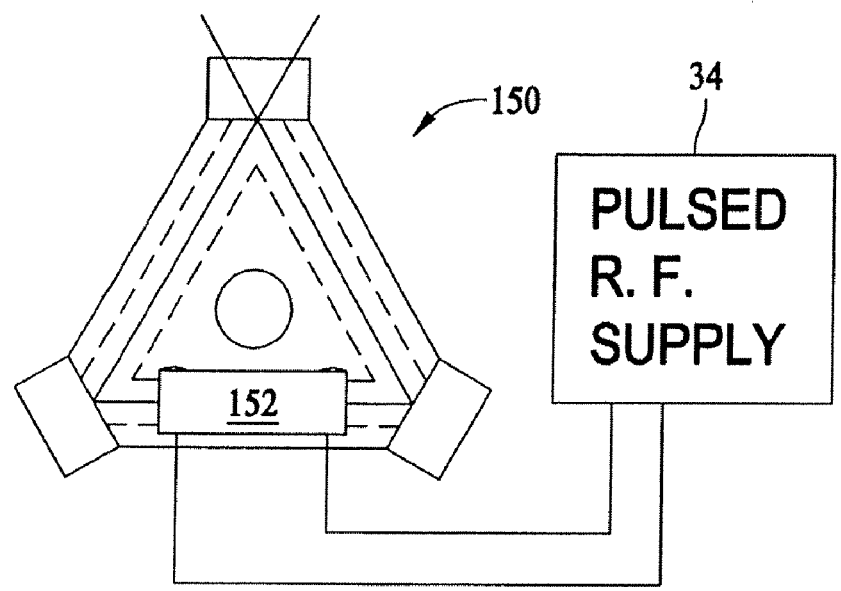
FIG. 4 is a top view of a ring laser gyroscope configured with capacitive plates coupled to a pulsed RF supply.

As described above, inductive coil 26 is one embodiment of an RF transmitting device which can be utilized with the RF energy source of pulsed RF supply 34. FIG. 4 illustrates an alternate embodiment of RLG 150 which may be utilized with pulsed RF supply 34. RLG 150 is, similar to RLG 10 (shown in FIG. 1) except that capacitive plates 152 and 154 (capacitive plate 154 not shown in FIG. 4) have been substituted for inductive coil 26.

Figure 5:
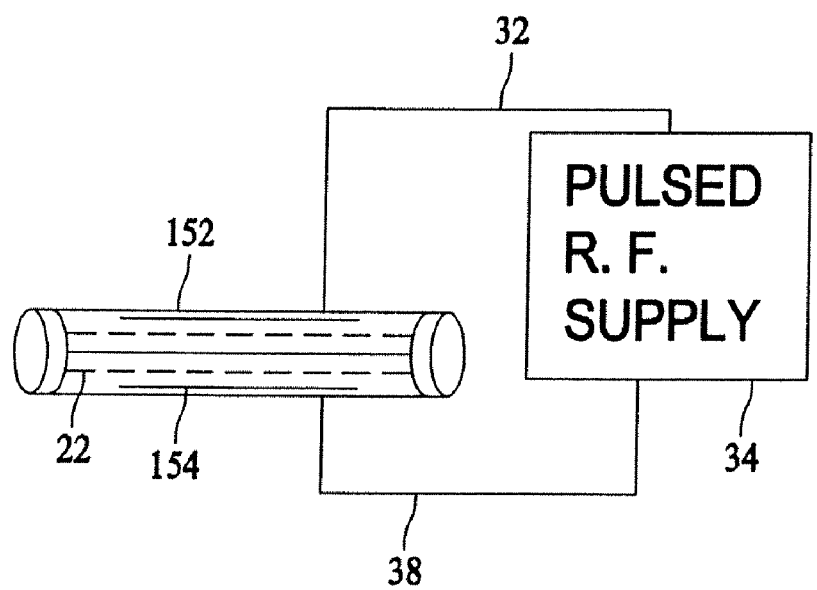
FIG. 5 is a side view of the ring laser gyroscope of FIG. 4 further illustrating the capacitive plates.

FIG. 5 schematically shows a side view of ring laser gyroscope 150. One gain bore section (e.g., discharge bore 22) is juxtaposed between embedded capacitive plates 152 and 154. Capacitive plate 152 is coupled by conductor 32 to pulsed RF supply 34, and capacitive plate 154 is coupled by conductor 38 to pulsed RF supply 34. Any suitable conductive material may be used to form the capacitive plates. For example, conductive adhesive strips may be utilized to form capacitive plates 152 and 154.

Figure 6:
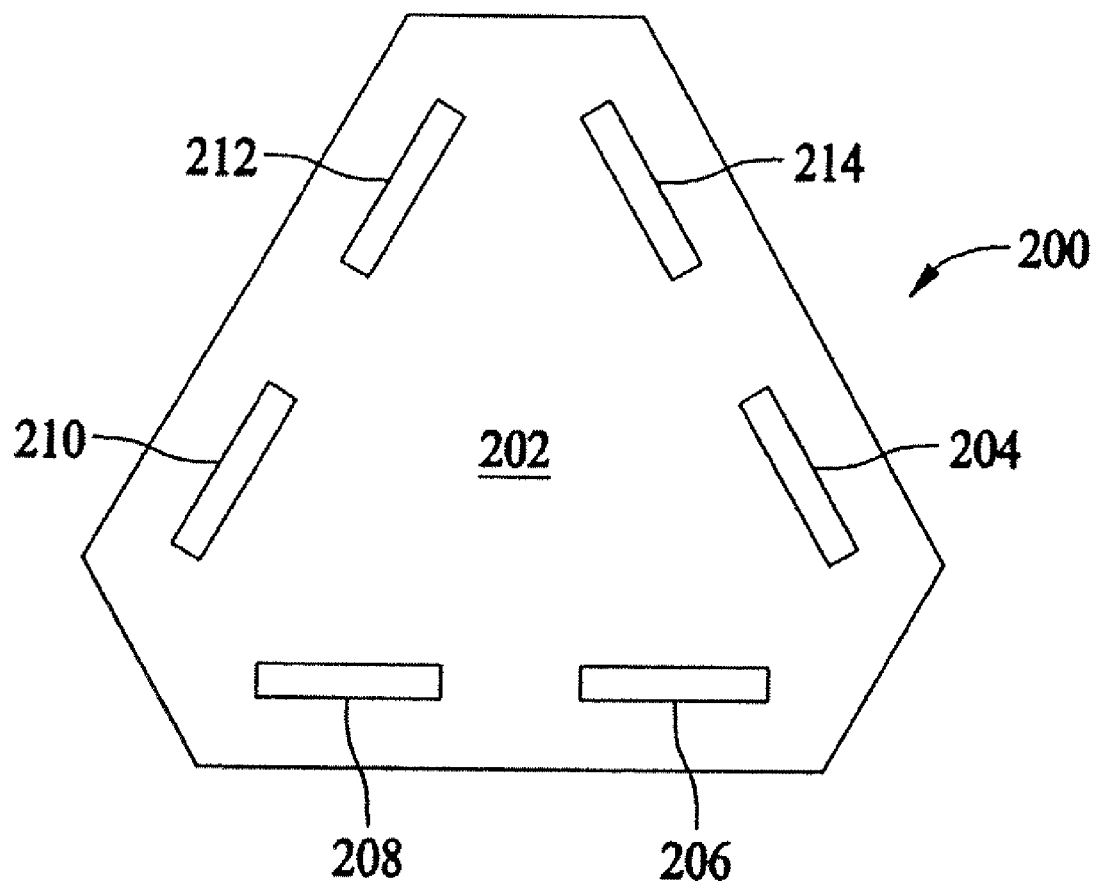
FIG. 6 is a top view of a gyroscope block which incorporates multiple pairs of capacitive plates which may be utilized with a pulsed RF supply.

FIG. 6 illustrates another alternative embodiment of a portion of a RLG 200 which can be utilized which pulsed RF supply 34. RLG 200 includes a gyroscope block 202 and a plurality of pairs of capacitive plates. Specifically gyroscope block 202 includes six pairs of capacitive plates. In FIG. 6, capacitive plates 204, 206, 208, 210, 212 and 214 are shown. Similarly to FIG. 4, capacitive plates which are opposite the discharge bore corresponding to capacitive plates 204, 206, 208, 210, 212 and 214 are not shown. The embodiment of FIG. 6 should be construed as an illustration and not a limitation. Those of skill in the art will understand that a greater or lesser number of such plates may be used in configurations employing the methods and apparatus described herein.

Figure 7:
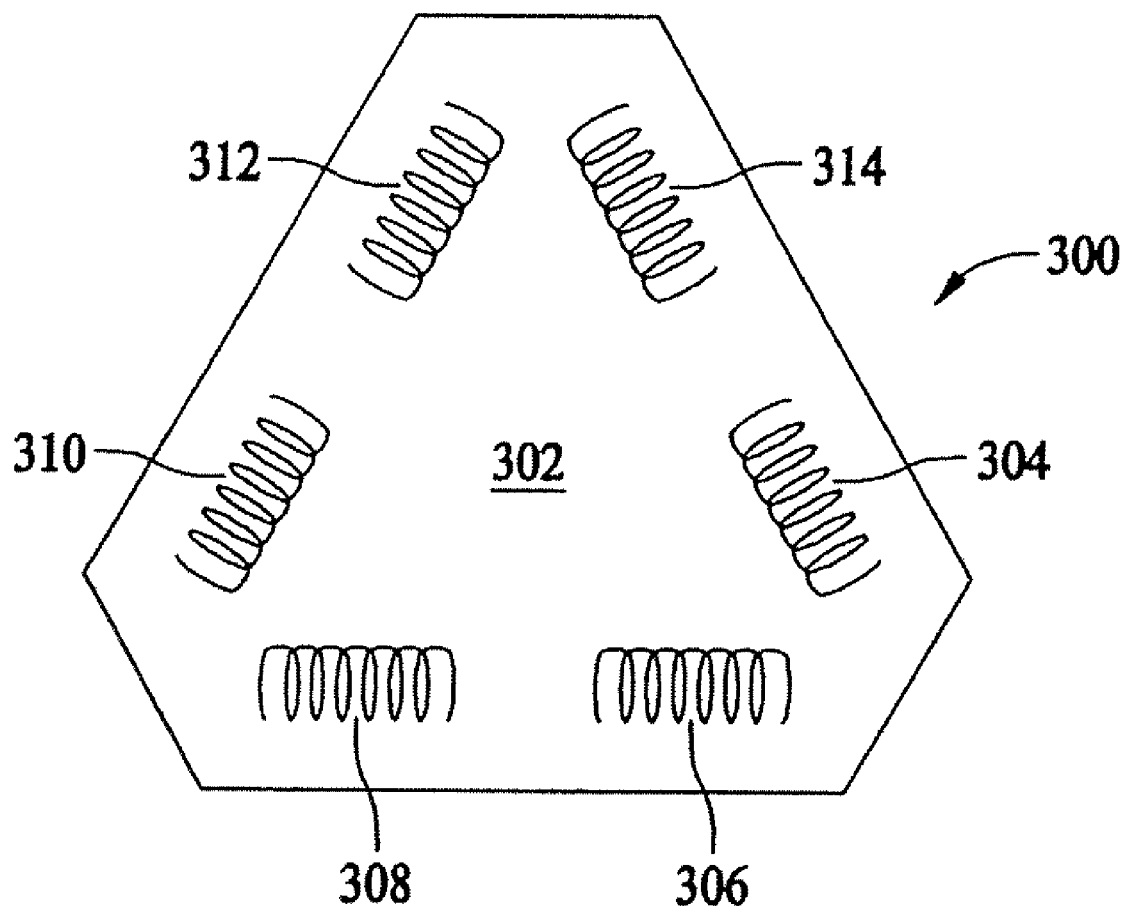
FIG. 7 is a top view of a gyroscope block which incorporates multiple inductive coils which may be utilized with a pulsed RF supply.

FIG. 7 illustrates still another alternative embodiment of a portion of a RLG 300 which includes a gyroscope block 302 and a plurality of conductance coils 304, 306, 308, 310, 312, and 314 that may be employed in place of the capacitive plates 204-214 illustrated in FIG. 6. At least one advantage to using multiple capacitive plates 204-214 or inductive coils 304-314 for each discharge bore of a RLG is that it allows for the utilization of several phases of the RF drive source. Utilization of several phases of RF power promotes a smoothing of the output power and allows the use of lower frequencies than might otherwise be necessary.

Multiple phases may be employed with any of the embodiments described herein using multiple RF transmitting device, for example, either inductive coils or capacitive plates. For example, in an embodiment using two pairs of capacitive plates, the capacitive plate pairs may be driven with a phase difference of 90 degrees. Other configurations may be similarly driven to maintain the desired smoothing effect. Operation of single and multiple inductive coils and capacitive plates are described in more detail in U.S. Pat. No. 5,381,436 entitled "Ring Laser Gyro Employing Radio Frequency For Pumping of Gain Medium" which issued to Nelson et al., the entire subject matter of which is hereby incorporated by reference in its entirety.

A method of generating and delivering a pulsed RF signal to an RF energy transmitting apparatus, for example inductive coil 26, is herein provided utilizing components which may be situated on a printed-circuit board (PCB) substrate within a ring laser gyroscope assembly. The pulsed RF device described herein utilized for power gas discharge within a ring laser gyroscope provides improved gas discharge lifetime and reduced cost for the gyroscope as compared to the above described DC discharge ring laser gyroscopes.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A ring laser gyroscope comprising:
    a gyroscope block comprising at least one discharge bore containing a gain medium;
    a radio frequency (RF) transmitting device within said gyroscope block in proximity to at least one discharge bore; and
    an RF energy source configured to apply a pulsed RF signal to said RF transmitting device, said RF transmitting device located such that the pulsed RF signal is applied to the gain medium to produce continuous light within the gyroscope block.

2. A ring laser gyroscope according to claim 1, wherein said RF transmitting device comprises at least one inductive coil wound around at least one discharge bore of said gyroscope block.

3. A ring laser gyroscope according to claim 1, wherein said RF transmitting device comprises at least one pair of capacitive plates embedded within said gyroscope block such that a portion of at least one discharge bore is juxtaposed between said capacitive plates.

4. A ring laser gyroscope according to claim 1, wherein said gyroscope block comprises a plurality of discharge bores, said ring laser gyroscope comprising at least one RF transmitting device within said gyroscope block in proximity to each discharge bore and located so as to encompass the respective discharge bore.

5. A ring laser gyroscope according to claim 1, wherein said RF energy source is configured to apply a pulsed RF signal having a duty cycle between 0 and 1 to said RF transmitting device.

6. A ring laser gyroscope according to claim 1, wherein said RF energy source comprises a pulse control circuit configured to control a duty cycle of a signal output by said RF energy source.

7. A ring laser gyroscope according to claim 6, wherein said pulse control circuit comprises at least one of a programmable integrated circuit, a microprocessor, a microcontroller, and a field programmable gate array programmed to provide control of the duty cycle of the signal output by said RF energy source.

8. A ring laser gyroscope according to claim 1, wherein said RF energy source comprises:
    a radio frequency oscillator;
    an output;
    at least one active device coupling said radio frequency oscillator to said output; and
    a pulse control circuit configured to modulate a bias current of said active device to control one or more of the duty cycle and the power envelope of a signal provided at said output.

9. A ring laser gyroscope according to claim 8, wherein said at least one active device comprises an RF driver amplifier configured to receive a signal from said RF oscillator, said pulse control circuit configured to modulate a bias current of said RF driver amplifier to control the duty cycle of a signal provided at said output.

10. A ring laser gyroscope according to claim 8, wherein said at least one active device comprises an RF power amplifier configured to receive a signal from said RF oscillator, said pulse control circuit configured to modulate a bias current of said RF power amplifier to control the power envelope of a signal provided at said output.

11. A method for pumping a gain medium within a discharge bore of a ring laser gyroscope, said method comprising:
    locating a radio frequency (RF) transmitting device in proximity to the discharge bore; and
    providing a pulsed RF signal to the transmitting device, such that the pulsed RF signal is applied to the gain medium to produce continuous light in the discharge bore.

12. A method according to claim 11, wherein said providing a pulsed RF signal to the transmitting device comprises controlling the duty cycle of a signal applied to the transmitting device.

13. A method according to claim 12, wherein said controlling the duty cycle comprises configuring a pulse control circuit to modulate a bias current of an RF driver amplifier utilized in coupling an RF oscillator to the transmitting device.

14. A method according to claim 11, wherein said providing a pulsed RF signal to the transmitting device comprises controlling the power envelope of a signal applied to the transmitting device.

15. A method according to claim 14, wherein said controlling the power envelope comprises configuring a pulse control circuit to modulate a bias current of an RF power amplifier utilized in coupling an RF oscillator to the transmitting device.

16. A ring laser gyroscope comprising:
    a gain medium;
    a radio frequency (RF) transmitting device; and
    a means for applying a signal to said RF transmitting device, the signal configured to initiate a discharge from said radio frequency transmitting device within said gain medium, wherein the signal is a pulsed RF signal having a duty cycle between zero and one to produce continuous light within the gain medium.

17. A ring laser gyroscope according to claim 16, comprising at least one discharge bore containing said gain medium, said RF transmitting device located so as to encompass the discharge bore.

18. A ring laser gyroscope according to claim 16, wherein said means comprises:
- an RF oscillator;
- an output;
- at least one active device coupling said radio frequency oscillator to said output; and
- a means for modulating a bias current of said active device to control one or more of the duty cycle and the power envelope of a signal provided at said output.

19. A ring laser gyroscope according to claim 18, wherein said at least one active device comprises an RF driver amplifier configured to receive a signal from said RF oscillator, said means for modulating modulates a bias current of said RF driver amplifier to control the duty cycle of a signal provided at said output.

20. A ring laser gyroscope according to claim 18, wherein said at least one active device comprises an RF power amplifier configured to receive a signal from said RF oscillator, said means for modulating modulates a bias current of said RF power amplifier to control the power envelope of a signal provided at said output.

* * * * *